United States Patent [19]

Liu et al.

[11] Patent Number: 4,980,430
[45] Date of Patent: Dec. 25, 1990

[54] EPOXY VINYL ETHERS AND SYNTHESIS OF AN EPOXY VINYL ETHER FROM A HYDROXYLATED VINYL ETHER AND A DIEPOXIDE

[75] Inventors: Kou-Chang Liu, Wayne; Fulvio J. Vara, Chester; James A. Dougherty, Pequannock, all of N.J.

[73] Assignee: GAF Chemicals Corporation, Wayne, N.J.

[21] Appl. No.: 481,037

[22] Filed: Feb. 16, 1990

Related U.S. Application Data

[63] Continuation-in-part of Ser. No. 424,453, Dec. 20, 1989, abandoned.

[51] Int. Cl.$^5$ ............................................. C08G 59/14
[52] U.S. Cl. ..................................... 525/529; 522/100
[58] Field of Search ......................................... 525/529

[56] References Cited

U.S. PATENT DOCUMENTS

| | | | |
|---|---|---|---|
| 4,156,035 | 5/1979 | Tsao | 204/159.11 |
| 4,347,343 | 8/1982 | Brewbaker | 525/531 |
| 4,654,379 | 3/1987 | Lapin | 522/15 |

OTHER PUBLICATIONS

Lapin, "Electron Beam Activated Cationic Curing of Vinyl Ethers," Radcure '86:Conference Proceedings of *Association for Finishing Processes*, Baltimore, Md., 1986, pp. 15-15-15-26.
Lapin, "Vinyl Ether Functionalized Urethane Oligomers . . .," Radtech '88: N. America Conference Proceedings of *Radtech Int.*, New Orleans, La., 1988, pp. 395–404.
Vara et al., "Vinyl Ether in UV and EB Induced Cationic Curing," Radcure '86: Conference Proceedings of *Assn. for Finishing Processes*, 1986, Baltimore, Md., 11 Pages.
Nelson et al., "Regulatory Restrictions on Commercializing New Chemicals," Radtech 88: Conference Proceedings of *Radtech Int.*, New Orleans, La., 1988, pp. 120–126.
J. A. Dougherty and F. J. Vara, L. R. Anderson, "Radcure '86": Conference Proceedings, "Association for Finishing Processes," Baltimore, 1986, 15-1.
J. A. Dougherty and F. J. Vara, "Radcure Europe '87": Conference Proceedings, "Association for Finishing Processes", Munich, West Germany, 1987, 5-1.
J. V. Crivello, J. L. Lee, D. A. Conlon, "Radiation Curing VI: Conference Proceedings", Association for Finishing Porcesses, Chicago, 1982, 4–28.
S. C. Lapin, "Radcure '86: Conference Proceedings", Association for Finishing Processes, Baltimore, 1986, 15-15.
S. C. Lapin, "RadTech '88-North America: Conference Proceedings" RadTech International, New Orleans, 1988, p. 395.
A. D. Ketley and Jung-Hsien Tsao, *J. Radiation Curing*, Apr., 1979, p. 22.
W. C. Perkins, *J. Radiation Curing*, Jan., 1981, p. 16.
P. C. Nelson and E. J. Moran, "RadTech '88-North America: Conference Proceedings", RadTech International, New Orleans, 1988, p. 120.
B. L. Brann, "RadTech Europe '89: Conference Proceedings", Radtech Europe, Florence, 1989, p. 565.
F. J. Vara and Jim Dougherty, Radcure '89 Conference Proceedings, "Concurrent Cationic/Free Radical Polymerization of Vinyl Ethers with Acrylate Functional Oligomers".
F. J. Vara and J. A. Dougherty, Water–Borne and Higher–Solids Coating Symposium, Feb. 1990, "Vinyl Ether in UV and EB Induced Cationic Curing".

*Primary Examiner*—Lewis T. Jacobs
*Assistant Examiner*—Robert E. Sellers, II
*Attorney, Agent, or Firm*—Marilyn J. Maue; Joshua J. Ward

[57] ABSTRACT

This invention relates to epoxy vinyl ethers having the formula:

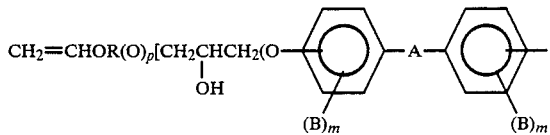

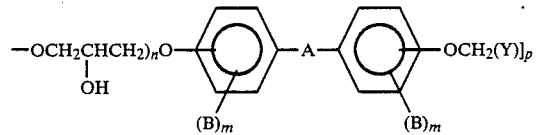

where R is a polyvalent linear, branched or cyclic hydrocarbon radical having from 2 to 20 carbon atoms, optionally substituted with alkyleneoxy; A is branched or linear $C_1$ to $C_4$ alkylene; B is halogen or lower alkyl; m has a value of from 0 to 4; n has a value of from 0 to 20; p has a value of from 1 to 5; and T is pt,11
when p is one, and is

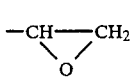

or a mixture of

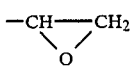

and

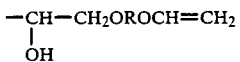

when p is greater than one.

11 Claims, No Drawings

EPOXY VINYL ETHERS AND SYNTHESIS OF AN EPOXY VINYL ETHER FROM A HYDROXYLATED VINYL ETHER AND A DIEPOXIDE

Continuation-in-part of Ser. No. 424,453, Dec. 20, 1989, abandoned.

In one aspect the invention relates to novel epoxy vinyl ether oligomers or monomers which are rapidly curable by cationic radiation to durable protective coatings or films having high resistance to abrasion and chemical attack. In another aspect the invention relates to epoxy vinyl ethers as reactive monomers in the curing of vinyl ether, epoxy or acrylate monomers or polymers. In still another aspect, the invention relates to a method of synthesizing the present epoxy vinyl ethers.

BACKGROUND OF THE INVENTION

Certain radiation curable coatings and films such as those formed from the acrylates, particularly propane trimethanol triacrylate, trimethacrylate, pentaerythritol triacrylate, and hexanediol diacylate or methacrylate, are in great demand because of their rapid curing properties.

Since acrylate compounds are not conducive to cationically induced radiation curing, they require more costly free radical systems which are oxygen inhibited unless effected in an inert atmosphere, generally under a blanket of nitrogen. Although formulation with a photoinitiator which undergoes bimolecular reaction with a hydrogen donor minimizes the inhibitory effect of air, this benefit is realized at the expense of a greatly reduced cure rate. Also, it is found that polymerization or curing in free radical systems ceases almost immediately upon removal from the source of radiation; thus, the cured product likely contains significant amounts of unpolymerized components. Accordingly, it is an aim of research to develop a compound having the beneficial properties of acrylates but which is amenable to radiation curing at a rapid rate by cationically induced polymerization which is not oxygen inhibited and which permits continued polymerization after removal from the source of radiation exposure.

Finally, it is noted that the unsubstituted acrylates are sensitizers and skin irritants as well as being carcinogenic, so that specialized safety precautions must be taken to protect operators from exposure. Although alkoxylation has lessened irritancy of the acrylates, their carcinogenic properties are not reduced.

Accordingly, it is an object of this invention to overcome or minimize the above described deficiencies and to provide oligomeric materials capable of altering the curing characteristics of vinyl ether, epoxy and acrylate monomers and polymers.

Another object of this invention is to provide an economical and commercially feasible process for synthesizing radiation curable epoxy vinyl ethers.

Still another object of this invention is to provide compounds which possess good photoresist properties.

Another object is to provide a homopolymerizable compound readily curable by cationic radiation to a hard coating or film which is resistant to chemical attack.

These and other objects of the invention will become apparent from the following description and disclosure.

THE INVENTION

According to this invention there is provided an epoxy vinyl ether having the formula

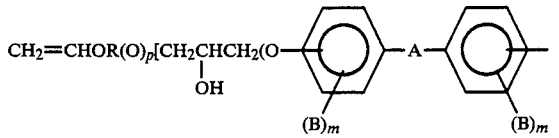

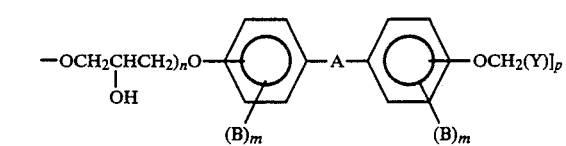

wherein R is a polyvalent linear, branched or cyclic hydrocarbon radical having from 2 to 20 carbon atoms, optionally substituted with alkyleneoxy; A is branched or linear $C_1$ to $C_4$ alkylene; B is halogen or lower alkyl; m has a value of from 0 to 4; n has a value of from 0 to 20; has a value of from 1 to 5 and Y is

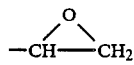

when p is 1 and is

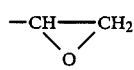

or a mixture of

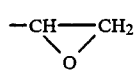

and

when p is greater than one. . Of the above defined epoxy vinyl ethers, those wherein R is $C_2$ to $C_6$ alkylene, A is —$CH_2$— or

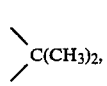

m has a value of 0; n has a value of from 0 to 12 are preferred. Most preferred of this group are the products wherein Y is

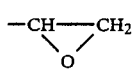

and p is 1-5.

The method of synthesizing the above epoxy vinyl ethers involves the reaction of a hydroxylated vinyl ether reactant, $(HO)_pROCH{=}CH_2$, and a diepoxy aryl hydroxyalkyl ether coreactant,

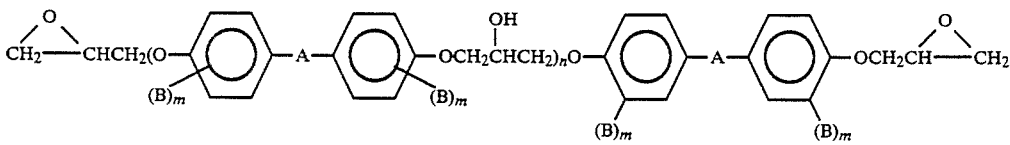

wherein R, A, B, m, n and p are as defined.

The mole ratio of reactants is critical and is the ratio where the number of epoxy groups in the reaction mixture exceeds the number of hydroxy groups in the reaction mixture by at least one. Hence, where the hydroxyvinyl ether reactant is $(HO)_3ROCH=CH_2$, the mole ratio of reactant to coreactant is between 1:2 and 1:3; when $(HO)_5ROCH=CH_2$ is substituted, the ratio is between 1:3 and 1:5 and when $HOROCH=CH_2$ is the reactant, the ratio is 1:1. In accordance with the species of products in this invention, the overall mole ratio of reactant to coreactant is from 1:1 to 1:5.

The reaction can be carried out in the presence of air or in the absence of oxygen under a blanket of inert gas. Generally, the present condensation reaction is carried out at a temperature of between about 100° and about 175° C. under atmospheric pressure for a period of from 0.5 to 200 hours. Preferred reaction parameters include a temperature of from about 120° to about 160° C. for a period of from about 2 to about 100 hours.

The reaction is also conducted in the presence of a base catalyst such as particulate sodium, potassium, or lithium metal, sodium or potassium hydroxide or hydride. The catalyst is present in an amount of from about 0.01 to about 2 wt. %, preferably from about 0.1 to about 1 wt. % of the total mixture. When the reactants and products included herein are liquids, they are generally synthesized in the absence of diluents or solvents which are otherwise required for more viscous or solid reactants.

Suitable hydroxylated vinyl ether reactants include the mono vinyl ether of cyclohexanetrimethanol, the monovinyl ether of cyclohexanedimethanol, the monovinyl ether of tris-(hydroxymethyl) ethane, the divinyl ether of 2-ethyl-2(hydroxymethyl) 1,3-propanediol, the divinyl ether of tris(hydroxymethyl) ethane, tetra(hydroxyethyl) vinyloxy hexane, (2-hydroxyethyl) vinyl ether, (3-hydroxypropyl) vinyl ether, the monovinyl ether of 3-ethyl-1,6-hexanediol, (4-hydroxybutyl) vinyl ether, the monovinyl ether of 2-methyl-1,8-octanediol, (vinyloxy) cresol, (vinyloxy) xylol and alkoxylated derivatives thereof containing from 1 to 6 ethyleneoxy or propyleneoxy units. Suitable aromatic polyepoxy reactants include the terminally substituted diepoxy compounds of bisphenol A and bisphenol F, resins and compounds wherein one or more of the phenyl groups is substituted with halo or $C_1$ to $C_4$ alkyl radicals.

A commercially available group of diepoxy reactants suitable for use in the present reaction are the Epon epoxy resins supplied by Shell Chemical Company. These resins have the following structure pages 10 through 21 of Chapter 2 of HANDBOOK OF EPOXY RESINS, by Henry Lee and Kris Neville, published by McGraw Hill Book Company, 1967.

The products of this invention are useful chemical intermediates and can be homopolymerized to hard chemically resistant films and coatings which have good substrate substantivity. Alternatively, the present compounds can be mixed with alkenyl ether, alkenyl ester, epoxide or acrylate monomers or polymers to impart rapid radiation curing properties in the presence of a cationic photoinitiator. Cross-linking copolymerizations can be carried out in the presence of air to produce highly desirable films and coatings which retain the desirable properties of both monomers or their polymerized derivatives. Curable compositions containing between about 0 and about 80% of a vinyl ether, an epoxide, an acrylate or a methacrylate comonomer or a polymer thereof and between about 20% and about 100% of the present epoxy vinyl ether in the presence of from about 0.05 to about 5 wt. % of a cationic photoinitiator are suitable radiation curable coatings which are polymerized by exposure to UV light, electron beam, laser emission or other source of radiation. Between about 2 and about 50 wt. % of the present product with from about 0.1 to about 5 wt. % of a conventional photoinitiator, such as an onium salt including the triphenyl sulfonium salt of phosphorous hexafluoride, diphenyl iodium salt, tetrazolium chloride, phenyl onium salts or aryl alkyl onium salts, cationic initiators and/or free radical initiators such as 1-hydrocyclohexyl phenyl ketone (e.g. IRGACURE 184), 2-hydroxy-2-methyl-1-phenyl-1-propan-1-one (DAROCUR 1173), 2,2-dichloro-1-(4-phenoxyphenyl) ethanone (SANDORAY 1000) and other free radical and cationic initiators which are suitably employed in this invention are those described by M. J. M. Abadie, Advantages and Development of Photochemical Initiators, in the European Coatings Journal 5/1988 pages 350–358, can be admixed with an acrylic compound normally not conducive to rapid cationic radiation curing, such as an acrylate or methacrylate comonomer, to effect curing within a few seconds exposure to a source of radiation. These coatings are applied to a substrate such as glass, ceramic, wood, plastic, metal and the like in thicknesses of from about 0.1 to about 5 mils. Additionally, the compounds of this invention, because of their sensitivity to polymerization by radiation, find application as photoresist materials.

Curing of the present compounds or their admixtures with comonomers can be effected in less than 1 second by exposure to between about 100 and about 800 mil-

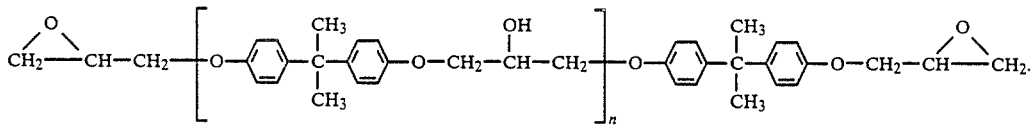

These epoxy reactants are readily prepared by well known procedures, such as the procedure outlined on lijoules/cm² of UV light, between about 0.5 and about 5 megarads of electron beam exposure or equivalent radiation exposures.

Having generally described the invention reference is now had to the accompanying examples which illustrate preferred embodiments which are not to be construed as limiting to the scope of the invention more broadly defined above and in the appended claims.

EXAMPLE 1

Epon 828 epoxy resin (1131 g, 3 moles), 4-hydroxybutyl vinyl ether (348.5 g, 3 moles) and potassium hydroxide (0.5 g, 85% pellets) were charged into a 2-liter flask equipped with a mechanical stirrer, nitrogen inlet, thermometer and a condenser with a drying tube. The solution was heated at 120° C. for 12 hours and 150° C. for 48 hours under a blanket of nitrogen. Greater than 95% conversion was obtained. The gel-like product containing

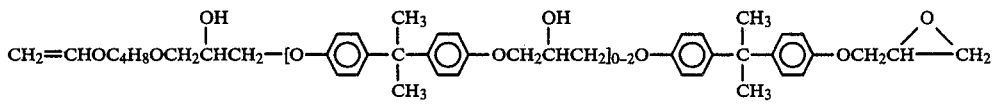

is recovered.

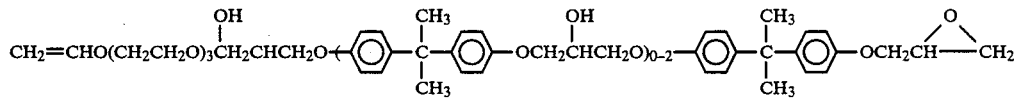

EXAMPLE 2

Epon 828 epoxy resin (2 mole), monovinyl ether of cyclohexane trimethanol (1 mole) and potassium hydroxide (0.4 g, 85% pellets) are charged into a 1-liter flask equipped as in Example 1. The solution is heated at 145° C. for 40 hours. Greater than 95% conversion is obtained. The gel-like product containing

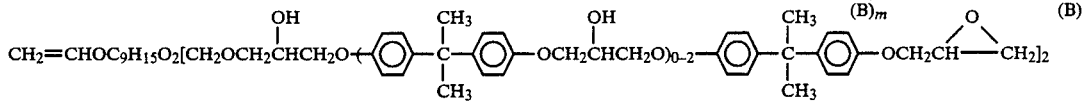

is recovered.

EXAMPLE 3

Epon 826 epoxy resin (364 g, 1 mole), monovinyl ether of cyclohexane dimethanol (170 g, 1 mole) and potassium hydroxide (0.4 g of 85% pellets) are charged into a one liter glass flask equipped as in Example 1. The solution is heated at 120° C. for 42 hours and at 150° C. for an additional 10 hours under a blanket of nitrogen. Greater than 95% conversion is obtained. The gel-like product containing

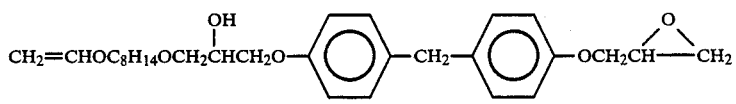

is recovered.

EXAMPLE 4

The product of Example 1 is mixed with 1% of triphenyl sulfonium salt of phosphorous hexafluoride coated on an aluminum panel in a thickness of 0.15 mil and the coated substrate is exposed for less than 1 second at room temperature to 400 millijoules/cm² radiation from a medium pressure mercury vapor lamp, after which the coated substrate is removed. A completely homopolymerized protective coating having resistance to chemical attack is achieved.

EXAMPLE 5

The procedure described in Example 4 is repeated except that 50% of the product of Example 2 was premixed with 50% of the divinyl ether of triethylene glycol. The coated substrate is completely cured in less than 1 second to a strong protective coating having high resistance to chemical attack.

EXAMPLE 6

The general procedure in Example 2 is repeated, except that 2 moles of monovinyl ether of triethylene glycol are used. The product

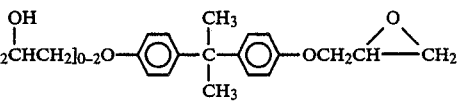

is obtained in at least 70% yield.

What is claimed is:

1. The compound having the formula

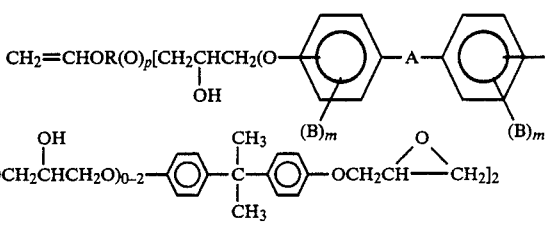

wherein R is a polyvalent linear, branched or cyclic hydrocarbon or alkoxylated hydrocarbon radical containing from 2 to 20 carbon atoms;

A is branched or linear $C_1$ to $C_4$ alkylene;

B is halogen or lower alkyl;

m has a value of from 0 to 4;

n has a value of from 0 to 20; p has a value of from 1 to 5 and Y is

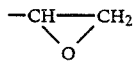

when p is 1 and is

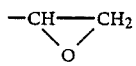

or a mixture of

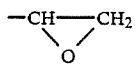

and

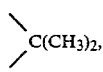

when
p is greater than one.

2. The compound of claim 1 wherein R is a $C_2$ to $C_6$ aliphatic hydrocarbon, A is —$CH_2$— or

m has a value of 0, n has a value of from 0 to 12 and p has a value of 1 to 3.

3. The compound

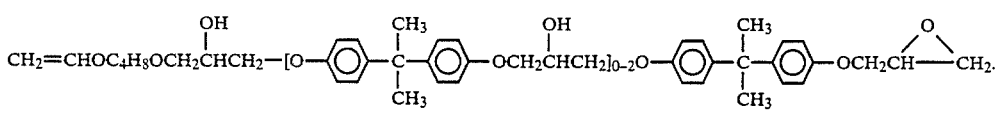

4. The compound

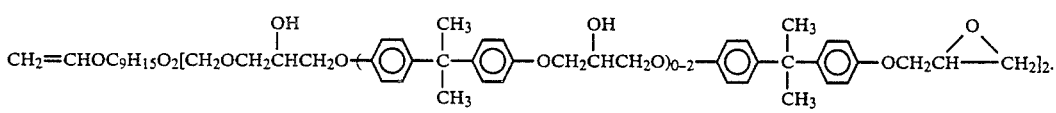

5. The compound

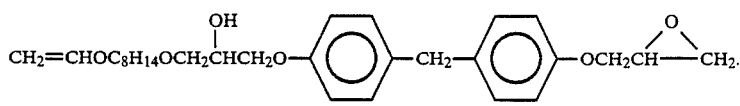

6. The process for synthesizing the compound of claim 1 by contacting a hydroxylated vinyl ether reactant of the formula $$(HO)_pROCH=CH_2$$

and a diepoxy aryl hydroxyalkyl ether coreactant of the formula

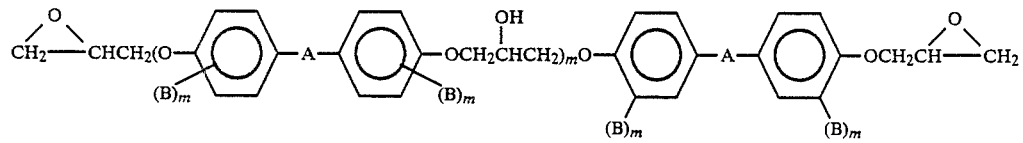

wherein R, A, B, m, n and p are as defined, and wherein the number of epoxy groups exceeds the number of hydroxy groups in the reaction mixture by 1 to 5 and reacting said reactant and coreactant at a temperature of from about 100° C. to 175° C. in the presence of from about 0.01 to about 2 wt. % of a base catalyst.

7. The process of claim 6 wherein said hydroxylated vinyl ether is $$CH_2=CHOC_4H_8OH$$

8. The process of claim 6 wherein said hydroxylated vinyl ether is the monovinyl ether of cyclohexane dimethanol.

9. The process of claim 6 wherein said hydroxylated vinyl ether is the monovinyl ether of cyclohexane trimethanol.

10. The process of claim 6 wherein A of the aromatic polyepoxide is

m has value of zero n has a value of from 0 to 4.

11. The process of claim 6 wherein A of the aromatic polyepoxide is —$CH_2$—, m has a value of zero and n has a value of from 0 to 4.

* * * * *